(12) United States Patent  
Oara

(10) Patent No.: US 7,702,643 B2  
(45) Date of Patent: Apr. 20, 2010

(54) SYSTEM AND METHOD FOR METAMODEL-BASED GAP ANALYSIS

(75) Inventor: Ioan Mihai Oara, Cary, NC (US)

(73) Assignee: Micro Focus (US), Inc., Rockville, MD (US)

(*) Notice: Subject to any disclaimer, the term of this patent is extended or adjusted under 35 U.S.C. 154(b) by 193 days.

(21) Appl. No.: 11/649,430

(22) Filed: Jan. 4, 2007

(65) Prior Publication Data

US 2008/0168046 A1    Jul. 10, 2008

(51) Int. Cl.
*G06F 17/00*    (2006.01)

(52) U.S. Cl. ........................................ 707/101; 707/102

(58) Field of Classification Search ............... None
See application file for complete search history.

(56) References Cited

U.S. PATENT DOCUMENTS

2005/0154976 A1* 7/2005 Nelson ........................ 715/513

OTHER PUBLICATIONS

Caplat et al, "Consideration about Model Mapping", Proceedings of the Workshop on Software Model Engineering, 2003, 6 pages.*

* cited by examiner

*Primary Examiner*—Uyen T. Le
(74) *Attorney, Agent, or Firm*—Kokka & Backus, PC

(57) ABSTRACT

A system and methods for comparing differences and similarities of at least two models including generating corresponding metamodel maps, visual representation of the models, and conducting a series of phases of comparison of the models using a mapping index, wherein the mapping index includes the metamodel maps and the visual representation of the models to produce a comparison output.

21 Claims, 11 Drawing Sheets

Generic Gap Analysis Flow

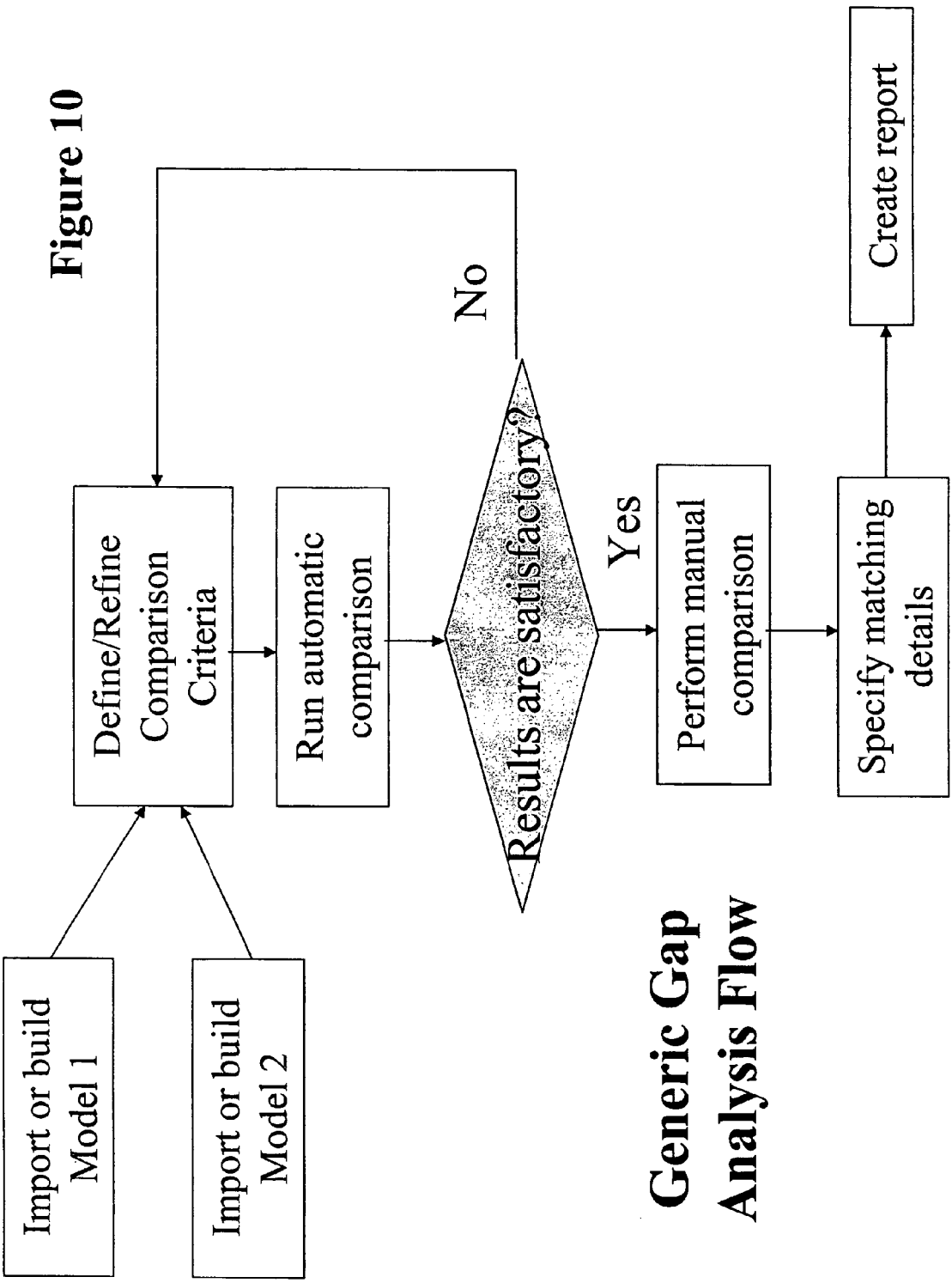

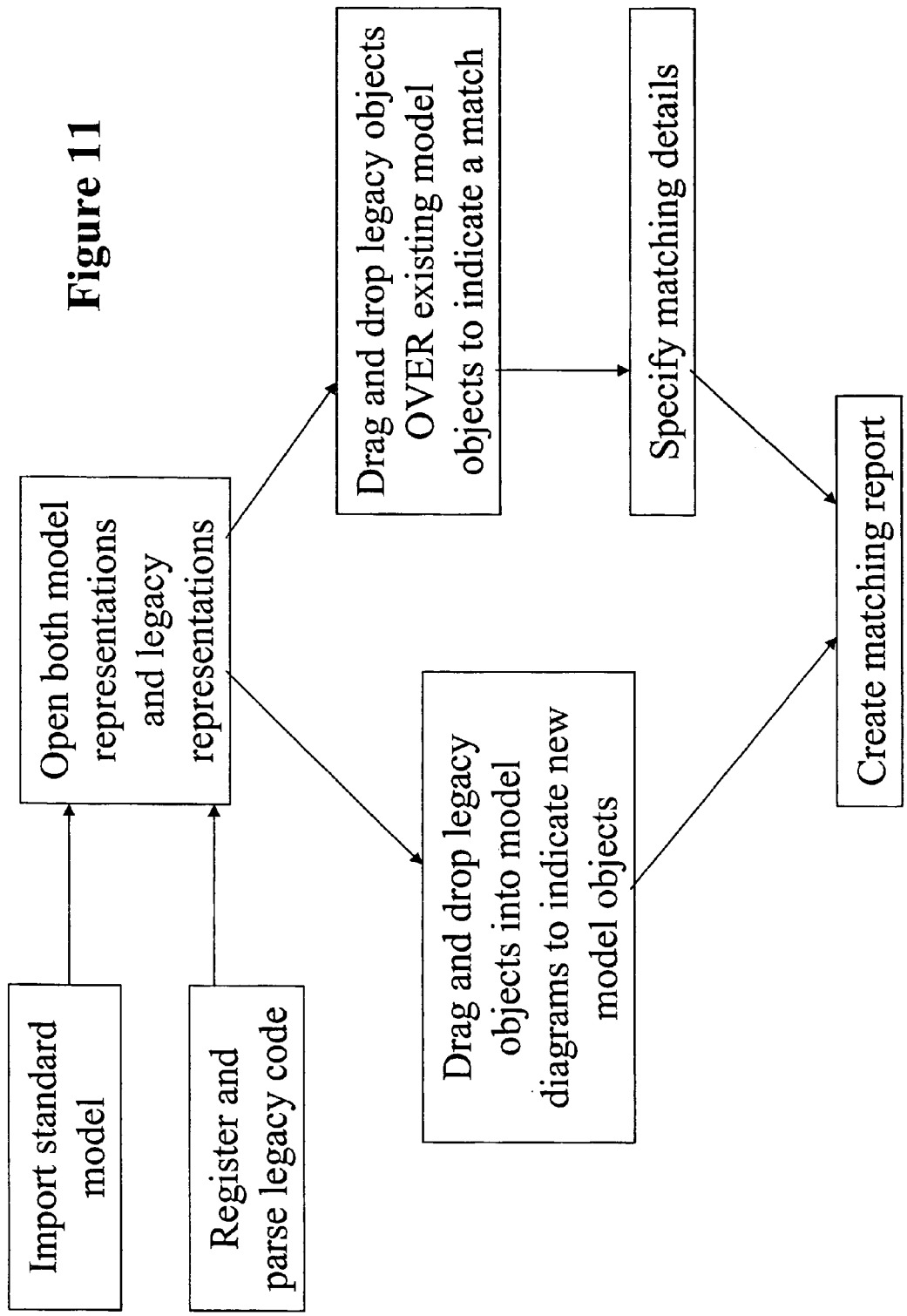

SYSTEM AND METHOD FOR METAMODEL-BASED GAP ANALYSIS

BACKGROUND OF THE INVENTION

1. Field of the Invention

The present invention relates generally to data and software model comparison. Further, the present invention relates to methods and systems for comparing differences between different model types.

2. Description of the Prior Art

Modern technical development is almost always based on using certain modeling techniques. Models may be either created from scratch and serve as design for a future implementation or may be extracted from an existing system to help understand and modify it. They may also originate as a combination of the two, for instance in the case when an "as is" model is first used to describe an existing system and then modified to describe a "to be" system.

As sometimes different companies or different teams come with models meant to describe the same reality, it becomes necessary to compare them. A comparison may reveal both the common elements and the differences between two models. This type of comparison and the detailed analysis related to it is referred to herein as "gap analysis."

Gap analysis does not necessarily may occur between the same type of models or between different types of models. The models are considered as being of the same type if they are based on the same metamodel and of different types if they have different metamodels. For instance two relational database schemas have the same type (but potentially different objects), while relational and hierarchical database schemas are of different types. Even when the two models are of different types a comparison is possible, as certain matches between them could be achieved. For instance, a relational table (which appears in a relational database schema) may be matched to a hierarchical record (which appears in the hierarchical schema).

Thus, there remains a need for methods and systems for comparing models even where model type differs, both for models having different metamodels and same metamodels.

SUMMARY OF THE INVENTION

A first aspect of the present invention is to provide method for comparing models including the steps of providing at least two models each having corresponding metamodel maps; comparing the metamodel maps; and generating a mapping index based upon the comparison step, thereby identifying differences and similarities of the models.

A second aspect of the present invention is to provide a method for comparing models including the steps of providing at least two models, generating metamodel maps for each model, comparing the models in a series of phases, and producing a mapping index for comparing the at least two metamodel maps, thereby identifying differences and similarities between the at least two models.

Another aspect of the present invention is to provide a system for comparing models, the system includes at least two models, with each model having a corresponding metamodel, wherein at least two of the metamodels are different; metamodel maps for making a first comparison of the models; a visual representation of the models for making a second comparison of the models, and a series of phases for comparison represented in a mapping index of the comparison of the metamodel maps.

Still another aspect of the present invention is to provide a system for comparing models includes two models each having a corresponding metamodel, wherein the metamodels are different from each other; a visual representation of the models; and a series of phases of comparison of the models that use the metamodel maps, wherein the metamodel differences are comparable in a mapping index, thereby providing a model comparison within the mapping index for models having different metamodels.

Thus, the present invention is directed to and provides methods and systems for comparing models and metamodels wherein the model and/or metamodel type is different for at least two models. Visual diagrammatic representations including a mapping index for comparing metamodels and metamodel mapping are provided.

These and other aspects of the present invention will become apparent to those skilled in the art after a reading of the following description of the preferred embodiment when considered with the drawings, as they support the claimed invention.

BRIEF DESCRIPTION OF THE DRAWINGS

FIGS. 10-11 show flow diagrams for method steps in accordance with an embodiment of the present invention.

DETAILED DESCRIPTION

Figure 1:
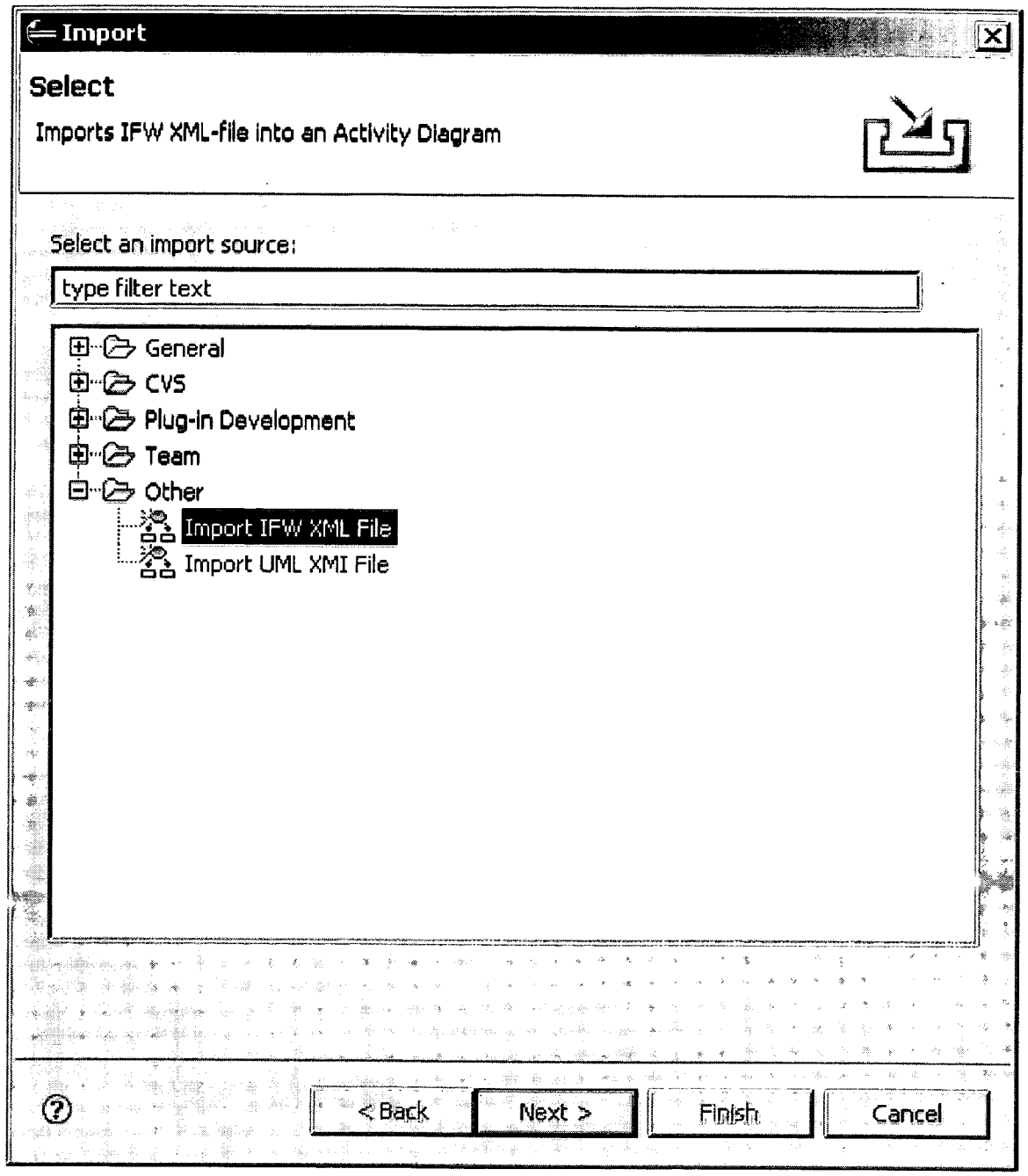
FIGS. 1 through 9 are illustrations of graphical user interfaces for various of a series of steps in the methods and systems of the present invention.

Referring now to the drawings in general, the illustrations are for the purpose of describing a preferred embodiment of the invention and are not intended to limit the invention thereto.

The present invention provides methods and systems for comparing models. Preferably, these are provided automatically, but manual steps and operation of the present invention is also within the scope of the present invention.

The present invention provides a method for comparing models including the steps of providing at least two models each having corresponding metamodel maps; comparing the metamodel maps; and generating a mapping index based upon the comparison step, thereby identifying differences and similarities of the models. Preferably, the method of the present invention further includes the step of indicating matches between the models indicated in the mapping index generated by the comparison of the metamodel maps.

Each model further includes entities or sets of entities having sub-entities, attributes, relationships, and/or definitions that are appropriate for each model. Comparison of the models is based upon and requires comparison of the entities within the models. However, it is not generally possible to compare entities within models that have different metamodels. Thus, the present invention provides a step of mapping the metamodels that correspond to each of the models, in particular where the metamodels are different and cannot otherwise be compared directly without a translation. The metamodel maps create a format for translation of the metamodels into a format allowing comparison of the models thereby. The method of the present invention preferably further includes a series of steps for comparison of the models in the step of comparing hereinabove. This series of comparing steps is repeated until a satisfactory result is realized.

The series of steps of comparing may also include phases, such as comparison of the metamodel maps and matching entities within the models. In a preferred embodiment of the method of the present invention, the phases include a first phase of fine-tuning comparison data, and a second phase of automatic comparison of the models. Optionally and preferably, a third phase of manual comparison is included in these phases.

Finally, the method further includes a step of reporting results of the comparison. Preferably the reporting includes visual, non-text-based representation of the comparison of the models, such as graphical representations of the comparison, matches, and other similarities or differences.

Another embodiment of the present invention provides a method for comparing models including the steps of providing at least two models, generating metamodel maps for each model, comparing the models in a series of phases, and producing a mapping index for comparing the at least two metamodel maps, thereby identifying differences and similarities between the at least two models. In this embodiment, at least two of the models are different and have different metamodel maps. These differences are indicated, along with similarities, based upon the comparing step, or series of steps, following the comparison of models using the mapping index.

In addition to methods for comparing models, the present invention also provides a system for comparing models includes two models each having a corresponding metamodel, wherein the metamodels are different from each other; a visual representation of the models; and a series of phases of comparison of the models that use the metamodel maps, wherein the metamodel differences are comparable in a mapping index, thereby providing a model comparison within the mapping index for models having different metamodels. Since the models are not directly comparable without a translation, the mapping index provides the translation of the models that enables comparison of the models. Preferably, the mapping index includes a multiplicity of factors that provide the comparison between the models and a weighting for the factors. The weighting of factors may be predetermined, entered into the system by a user or authorized administrator, and may be variable, depending upon the type of models included in the comparison.

The system is operable to provide the series of phases of comparison with a first comparison of the metamodel maps and a second comparison of the visual representations of the models. Any of the series of phases or steps of comparison by the method or system hereinabove may be automated, manual, or an integration of automatic and manual comparison of the models.

In another embodiment of the system for comparing models, the system includes at least two models, with each model having a corresponding metamodel, wherein at least two of the metamodels are different; metamodel maps for making a first comparison of the models; a visual representation of the models for making a second comparison of the models, and a series of phases for comparison represented in a mapping index of the comparison of the metamodel maps. Variations of the first system embodiment set forth hereinabove are also applicable to this embodiment, as appropriate.

Referring now to the figures and method steps for specific import or data entry of data or information associated with the models being compared in methods and systems of the present invention, the figures are provided to indicate one embodiment or representation of the invention, and are not intended to limit the invention thereto. The figures are intended in this embodiment to be considered in series for the purposes of illustrating the method steps associated with the present invention. One of ordinary skill in the art will appreciate that systems of the present invention, in particular with automated steps or phases are preferably implemented on a computer or network having at least a server computer and remote computers or portable smart devices capable of accessing the internet and/or operating software for performing such automated steps or viewing the outputs of such automated steps performed on the server computer and viewable by at least one user on a display and/or interact with the system thereby through communication with the server either directly or remotely via the network, either wired or wirelessly.

Figure 2:
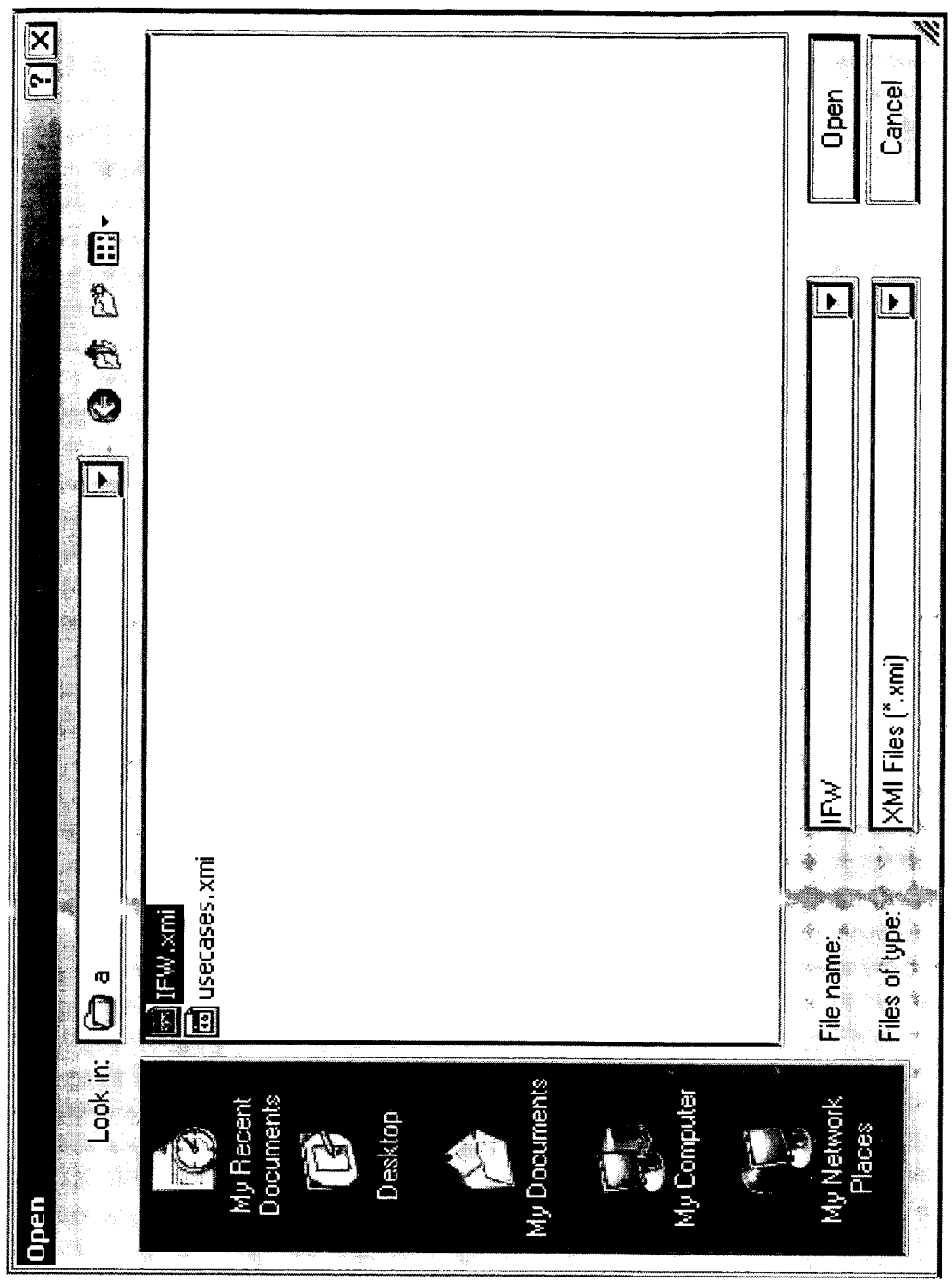
Figure 3:
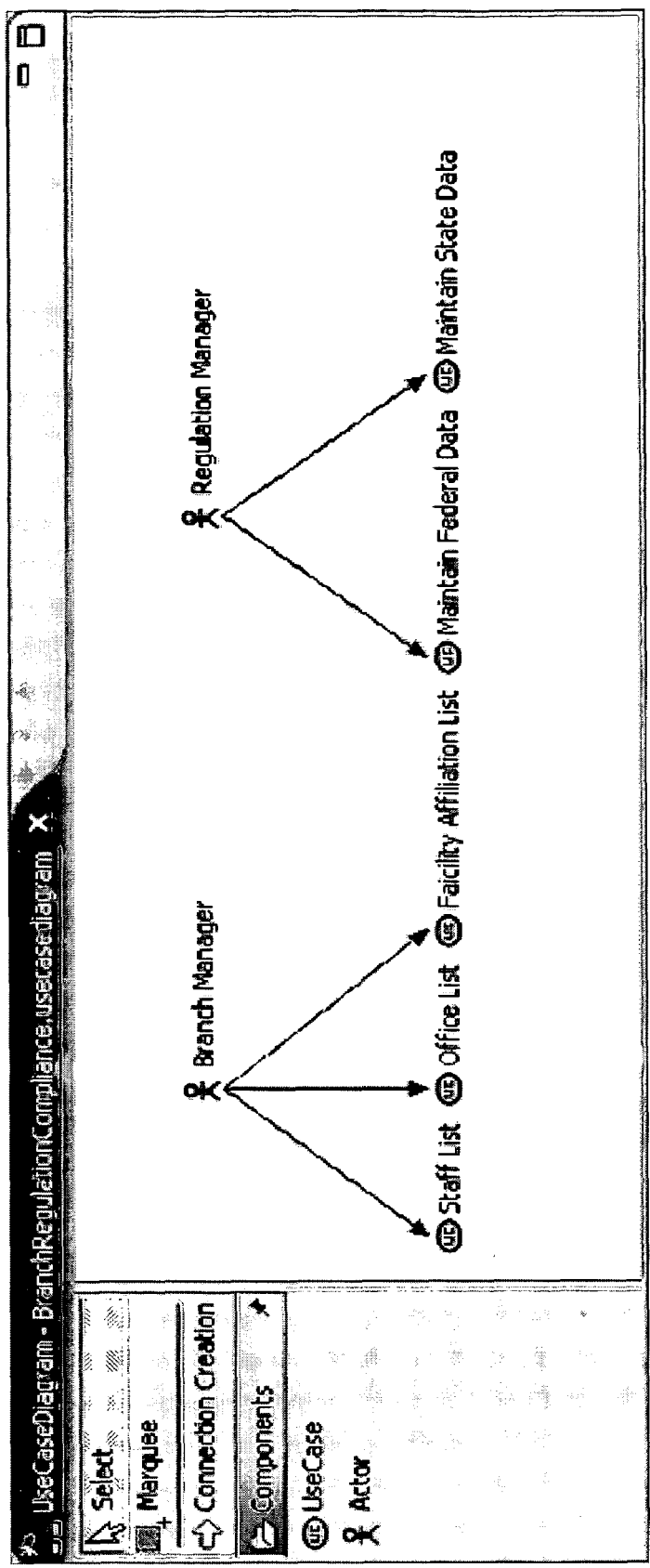
Figure 4:
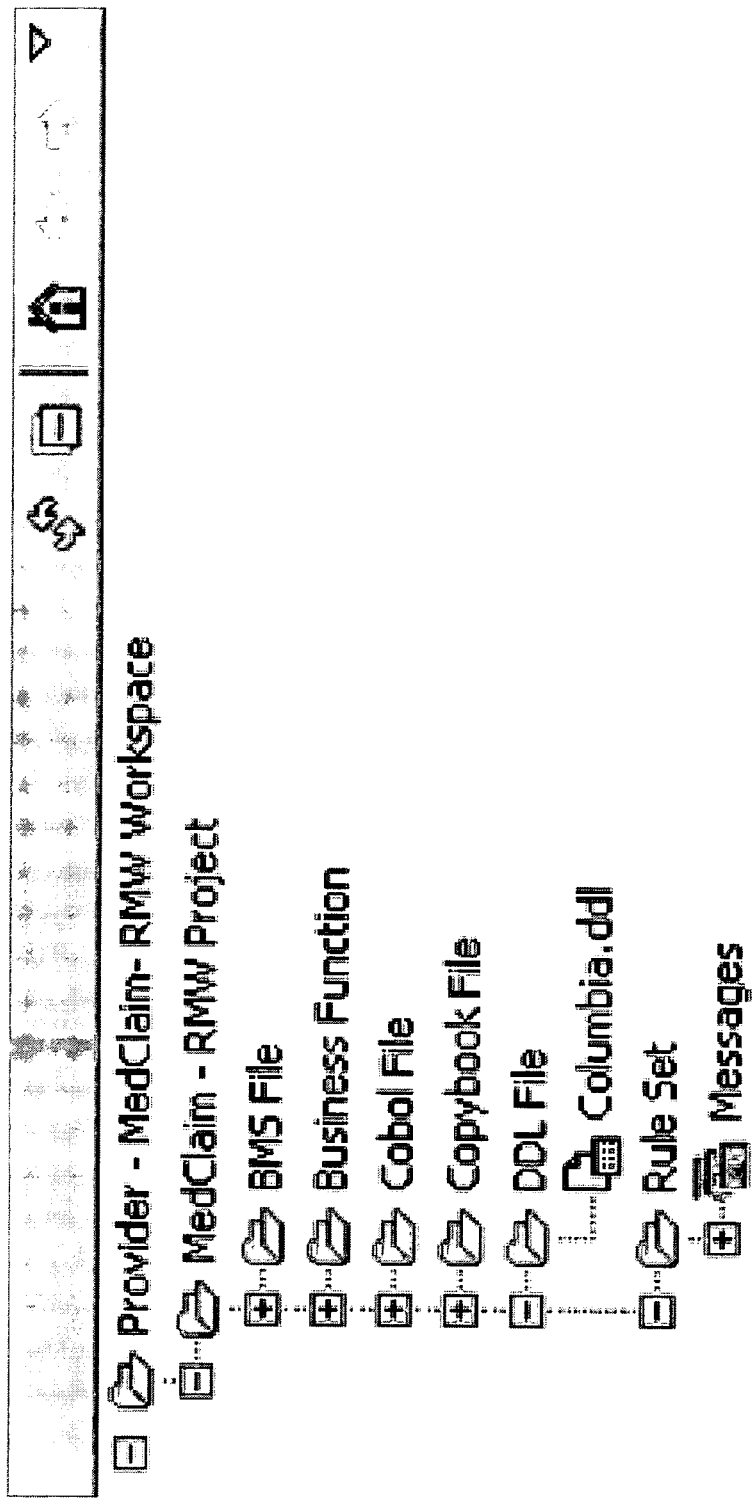
Figure 5:
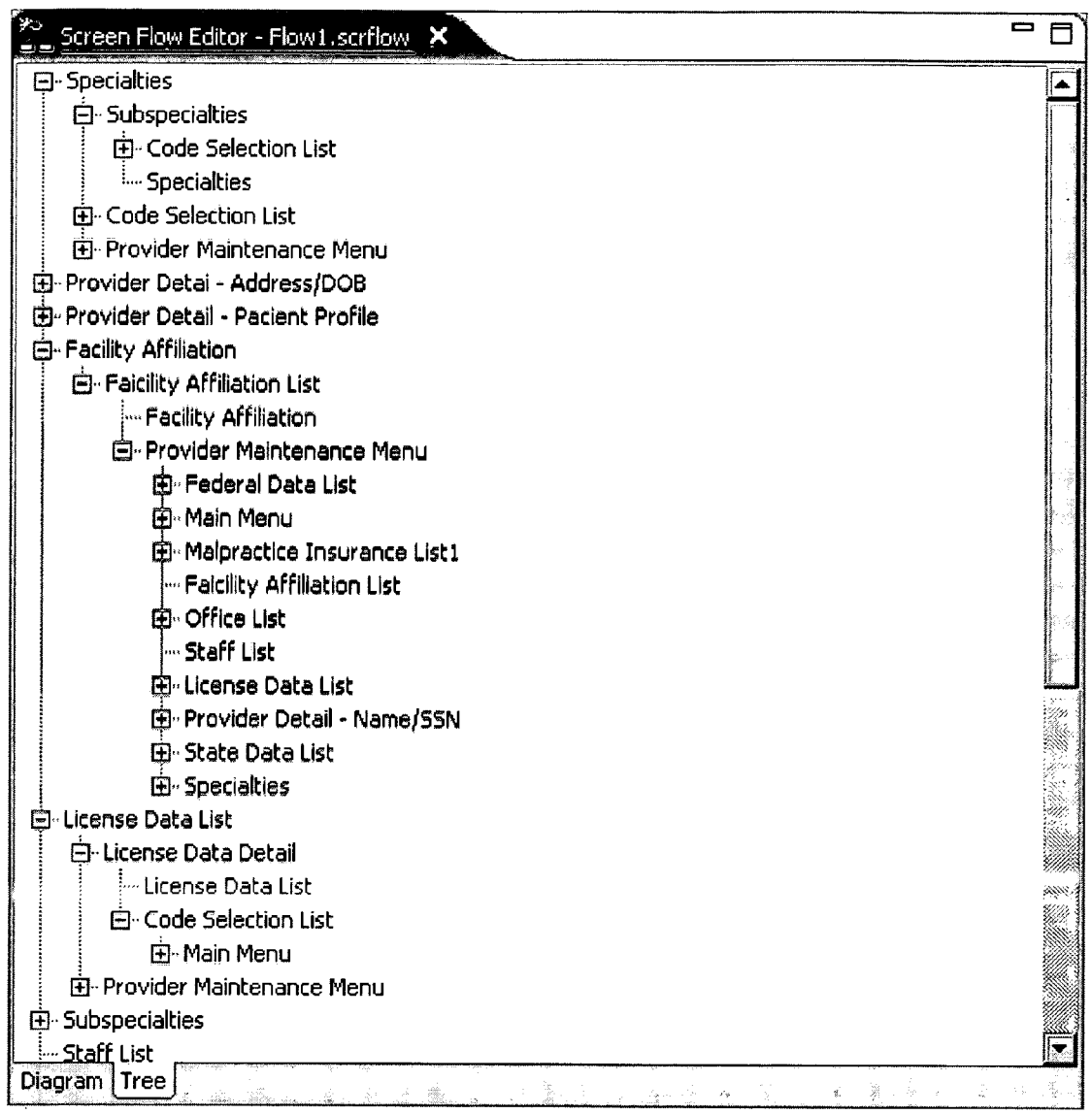
Figure 6:
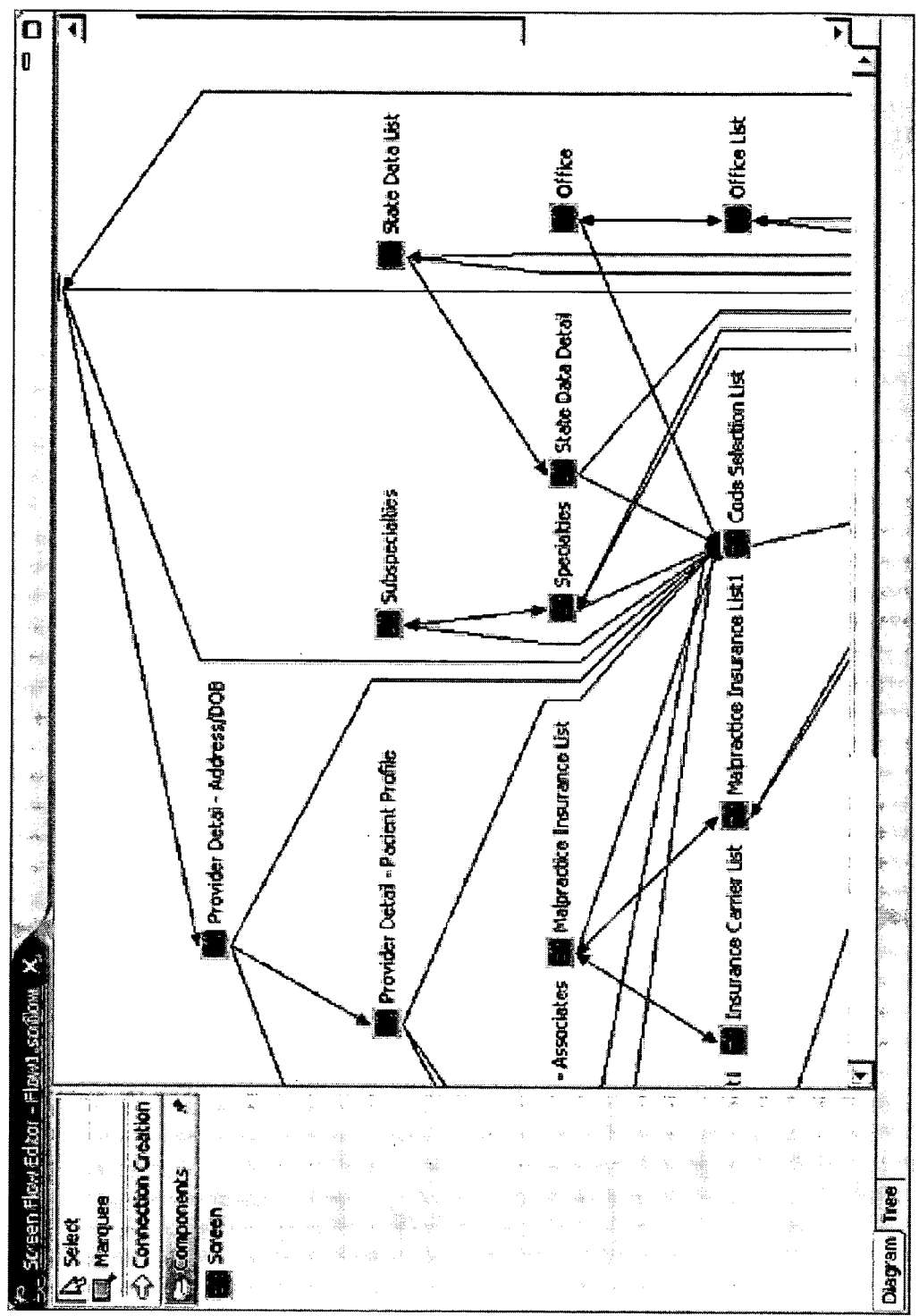
Figure 7:
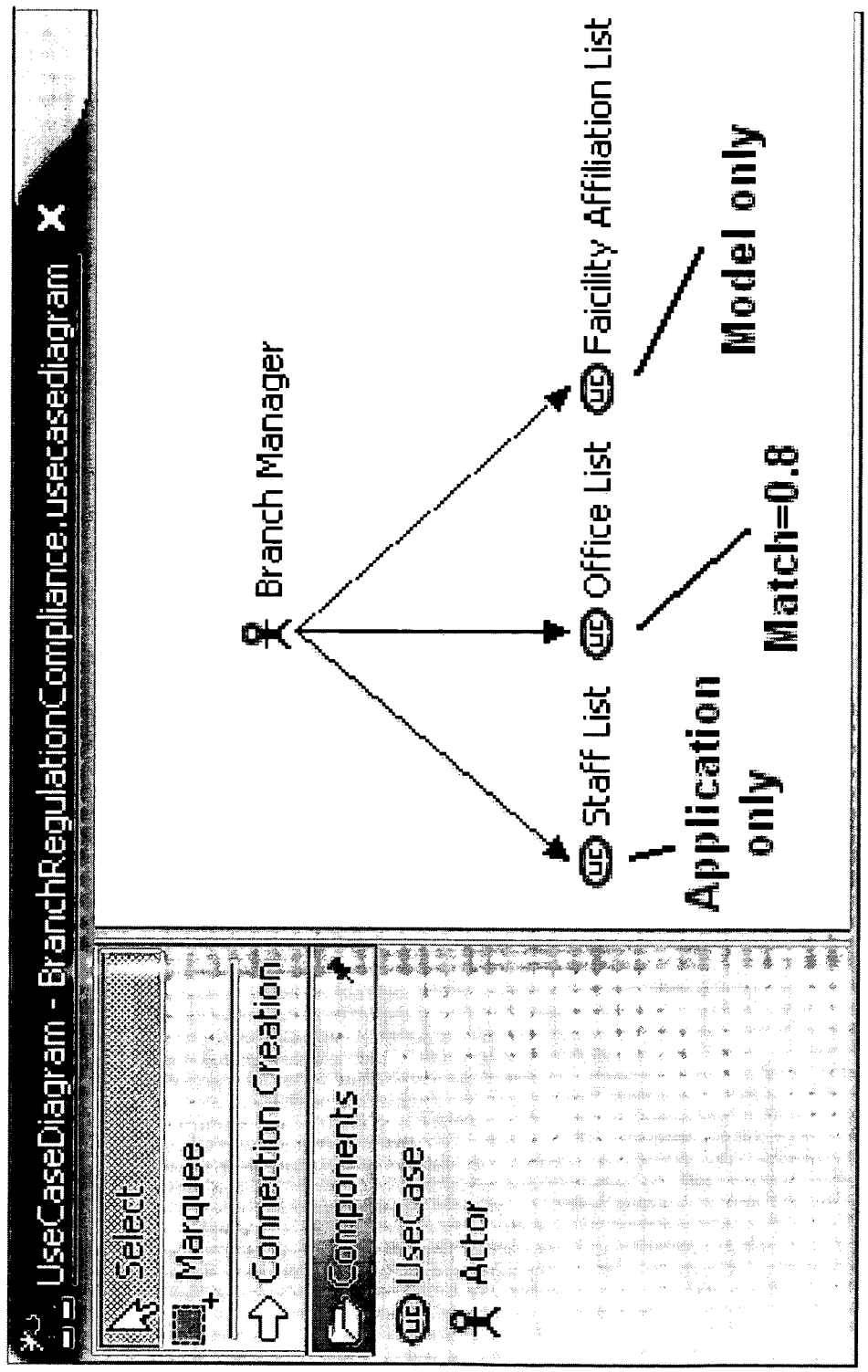
Figure 8:
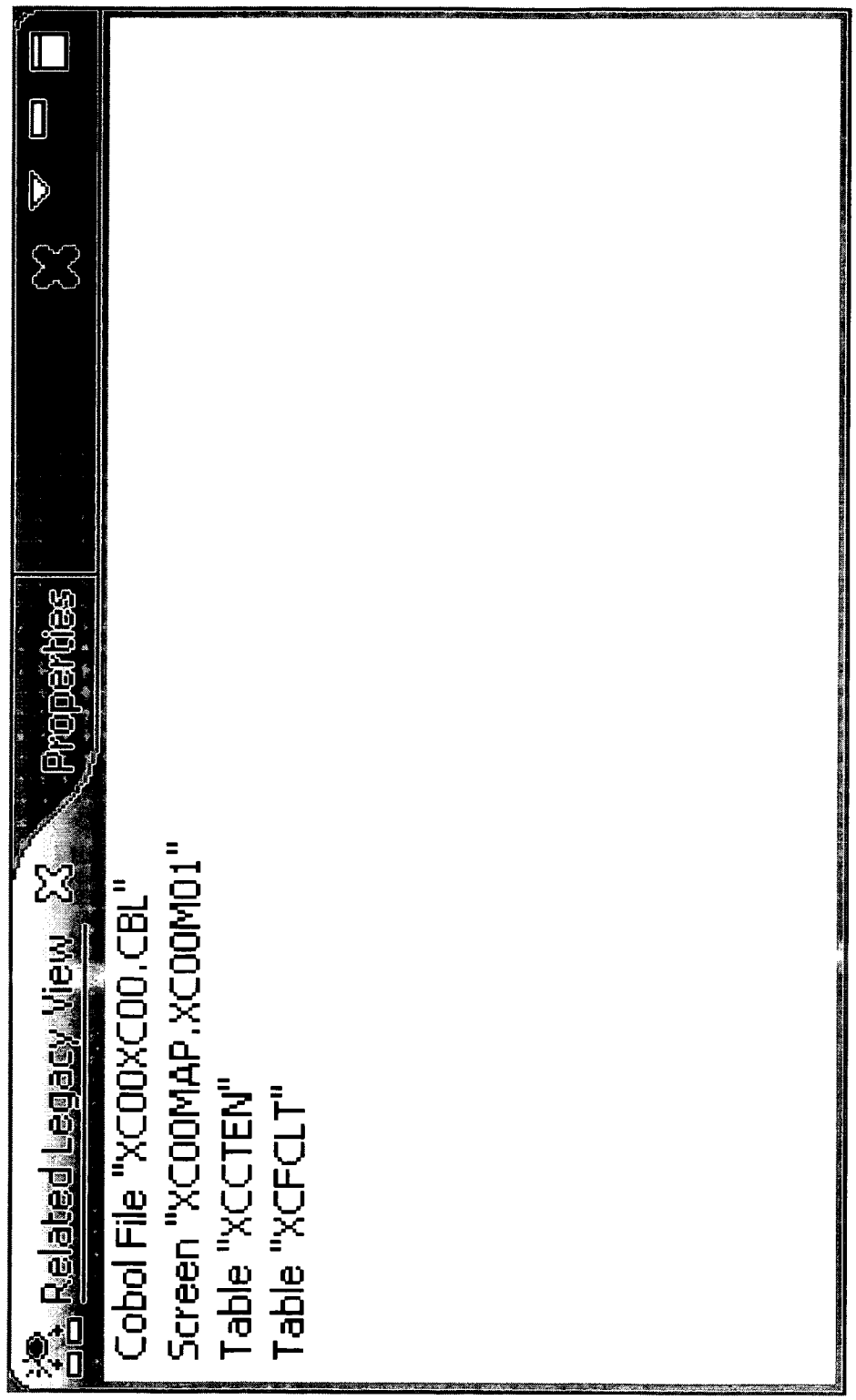
Figure 9:
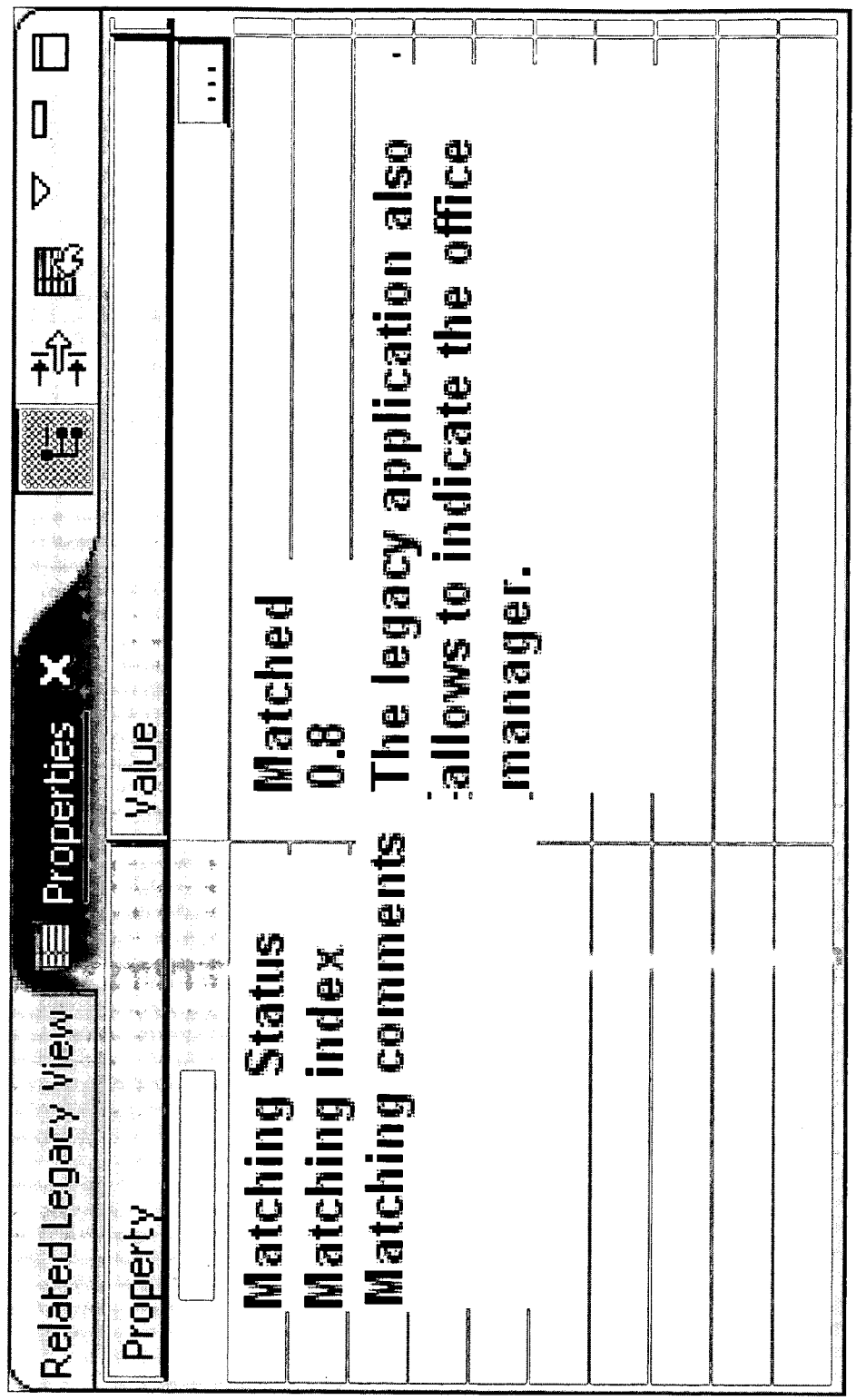

FIG. 1 shows an import model selection made by a user on a user interface of a display of a computer or portable device operable to run software for making the comparison of models set forth hereinabove. FIG. 2 shows the user interface view wherein the user may interactively select at least one model file. FIG. 3 illustrates a visual or graphical representation of a use case diagram associated with the selected model from FIG. 2. FIG. 4 is a user interface showing a file hierarchy indicating all legacy assets for the model selected. FIG. 5 shows a screen flow tree for the model selected. FIG. 6 shows a screen flow diagram corresponding to the model selected. FIG. 7 illustrates a graphical representation of matching status. FIG. 8 provides a user interface showing the related legacy information. FIG. 9 shows the matching detail, including matching status, matching index, and matching components on the left side of the user interface for the model comparison. FIG. 10 provides a generic gap analysis flow diagram for methods of the present invention. FIG. 11 shows a flow diagram for a standard model comparison with a legacy application for methods of the present invention.

The following section provides examples of implementations or scenarios according to the methods and systems of the present invention. Because generally the most important information that outputs from the comparisons of models, in particular having different metamodels, is indication of the differences or "gaps" between the models, the following description of preferred embodiments discuss these outputs as "gap analysis."

Gap analysis may be employed in various scenarios, such as the following.

Scenario 1: An application development team has developed a database design (in the form of a model) but also purchased or obtained another design from a software vendor. A decision needs to be made as to which is the more detailed and useful one. Moreover, even when one is chosen, it is interesting to know if the one excluded still contains some aspects which could be used to enhance the one selected. The gap analysis would reveal the differences and the commonality between the two designs allowing to merge the models and choose the best feature from each.

Scenario 2: An IT department of a company decides to buy a new accounting application from a vendor. While the pre-packaged accounting system may be better and richer then the existing one, there may still be some features in the existing one that should not be lost as they address some particular functionality aspects needed to run the business. The gap analysis may discover the differences in functionality and insure that no essential features are lost from the existing application.

Scenario 3: Every time when two companies merge, if there is any duplication in their application portfolios, the possibility exists that they need to be eliminated. A careful study must be employed to see which of the two should be retained and which should be eliminated. Gap analysis may help in this decision and may also point which features are not common and need to be preserved one way or another.

Scenario 4: A company has a packaged application from a vendor, of a given version N. The company has added some customized functions to this application. The vendor is now issuing version N+1 of its package. The company is interested to install this new version, but it's afraid of loosing all the customized functions. Before the new package is installed, these customized functions must be identified and re-implemented in version N+1 from the vendor.

Scenario 5: An application vendor has customized its standard application package for a number of its customers. When building a new version of the application, the vendor wants to consolidate all previous customizations (which existed in separate branches of the same basic package) into a single new version which will incorporate all changes. These individual customizations must be identified.

Preferably, the system performing gap analysis must be able to read and understand the two models being compared, in whatever form they are presented. Most modeling tools provide some form of export format such that the model information may be passed to another tool of the same kind or of other kind. For example, a UML model may be exported from a specialized tool in XMI format and it may be also imported in this format by another UML tool. Such commonly accepted formats are the bases for communicating models.

Besides being able to understand the models, the system would also give them a visual representation in the form of trees or diagrams. The particular visual representation is not essential to the system, but should be available, such that a user may view the information and sometimes perform manual comparisons.

A model consists in a number of entities having particular attributes and relationships between them. The gap analysis described in this system would perform comparisons between entities. Each entity in a model may be compared with an entity in the other model, or in a more general case, with a set of entities in the other model. The comparison produces matches. The match does not necessarily mean equality. A match may mean that Entity A from the first model and Entity B from the second model:

Are the same (for instance two tables having the exact same definitions)

Are very similar (two tables having almost the same columns)

One implements the other (a Java method and an UML action)

The gap analysis proceeds in a number of phases, which may be repeated until a satisfactory analysis is delivered.

Phase 1: Fine-tuning comparison criteria
Phase 2: Automatic comparison
Phase 3: Manual comparison
Phase 4: Reporting the results The first two phases are optional and are only meant to give the analyst a jump start in his work. For instance if each model consists of hundreds of entities, it is difficult to proceed with a manual match. An automatic comparison may result in a large number of matches, which the analyst can confirm or refute. A particular implementation of the system may or may not include automated matching. However, as automated matching may not always render the best results and Phase 3 functionality should be always available.

Phase 1—Fine-Tuning the Comparison Criteria

In this phase the user indicates which are the conditions for creating a match between two entities of two separate models.

Matching conditions may be adjusted depending of the peculiarities of the models. If the models are of the same type (based on the same metamodel), then only entities of the same type should be matched. For instance, if both models consist of UML action diagrams and use cases, then actions should be matched with actions, decisions with decisions, use cases with use cases and actors with actors.

If the two models are of different types (based on different metamodels), the system must either come with a preset mapping of the entity types or allow the user to create the mapping manually. An example, in the case of a relational database model and a hierarchical database model, a table on the relational side may be mapped into a segment on the hierarchical side. This mapping is at the metamodel level and only describes which type of matches are sought.

If two entities between the two models are mapped (either of the same type or of mapped types, as described above), then the automated matching is based on looking at their attributes. If the attributes are the same or very similar, then the entities are matched, otherwise they are not matched. The attributes used for comparisons may include the names of the entities, but also other attributes. For example, to match two tables between two separate relational schemas, the comparison may take in account the names of the tables as well as the amount of common columns. Furthermore, a "matching index" may be assigned, indicating the degree of matching. The index may be built in the system or may be available to the user for the purpose of fine-tuning the comparisons.

As an example, the matching index between two tables may be defined as

Matching index=(Name match)*(Number of common columns/Number of unique columns)

Where

Name match=I if the names are the same, I if they are different

Number of common columns=number of unique columns that exist in both tables

Number of unique columns=number of all unique columns that exist in the same tables.

Using such a measurement, the tables

Customer with columns (customer_id, customer_name)

Product with columns (product_id, product_name)

... will have the matching index zero. However, the tables

Customer with columns (customer_id, customer_name, customer_address)

Customer with columns (customer_id, customer_name, customer_age)

Will have the matching index 0.5, as the names are the same, there are 2 unique common columns and 4 unique columns between them.

Other sensible computations of the matching index may be devised and be either included in the system or made available for the user of the system to define.

Fine-tuning the automatic comparison of models may consists in modifying these computations of matching indexes as well setting thresholds for matching. The thresholds may be fine-tunes such that, for instance only the matches with matching index over a certain value are retained and the other discarded. For instance, if the matching threshold is 0.3, then the two tables in the example above are matched, but if the threshold is 0.7 then they are not considered matched.

The user of the system may execute automatic matches, review the results and then fine-tune the matching index computation and matching thresholds in order to obtain more relevant results.

Phase 2—Automatic Comparison

The automatic comparison would proceed as follows.

All entities of the same type in each of the models are grouped together.

If the two models have the same metamodel (same entity types) then every entity of one type in a model is compared with every entity of the same type in the second model.

If the two models are of different metamodels, then every entity of one type in a model is compared with every entity of the corresponding mapped type in the second model.

For every comparison between two entities, the matching index is calculated. If the matching index is over the threshold, then the two entities are considered matched and the matching information is saved internally. If the matching index is under the threshold, then the matching is discarded.

Phase 3—Manual Comparison

As the automatic matching is based on heuristics assumed by the system or by the user, it is possible that the results are not completely correct. As this is to be expected, it is important that the user can create matches manually or discard matches resulting from the automatic phase.

In manual matching, the user simply views the two models and chooses entities that he considers as matched. The models may be presented in various forms, like trees, diagrams or even simple lists of entities.

Various visual paradigms may be used to create or discard a matching. The system may use any of them. For instance, to create a match, the user:

Drags the visual representation of an entity (box, tree node, element in a list) and drops it over the visual representation of the matched entity.

Right-click on the visual representation of an entity, obtain a list of corresponding entities in the second model and select one of them (or more then one, if a one-to-many match is allowed)

As the user performs this operation, he may also indicate some parameters for a match. Two important parameters are the 'matching index' (as explained above) and 'matching comments,' in which the user may add any additional information about how the two entities match.

After the matching is performed (either automatically or manually), the matched entities may be marked in a visual way such that the user may easily see where matches exists. The visual marking may be accomplished in a number of ways, including using special colors for the visual representation of the entity, special fonts or special icons.

Furthermore, if an entity is marked as matched, the user may select it and obtain (for instance with a right click) the name of names of the corresponding matched entities of the opposite model. From this list, the user may access and modify the matching parameters (matching index and comments) or even request that the matching be discarded.

Phase 4—Reporting the Results

The visual representations described in the Manual Comparison phase already show the essential gap analysis information. The user can see which entities of each of the two models are matched and which are not matched, in the case for comparison of exactly two models. A separate report may present these results in a more concise manner.

Preferably, the gap analysis report indicating differences of the models compared according to the methods and system of the present invention preferably includes at least three sections, such as the following:

Entities in the first model that are not matched to the second model.

Entities in the second model that are not matched to the first model.

Matched entities.

The third section of the report may include additional matching information, as for instance the matching index and the comments for every match.

In one embodiment, a report for the results of the comparison produced by the systems and methods of the present invention follows the following tabular format in Table 1:

TABLE 1

| Entity type | Entity name | In first model | In second model | Matching index | Comments |
|---|---|---|---|---|---|
| Table | Branch | X | | 0 | |
| Table | Deposits | | X | 0 | |
| Table | Customer | X | X | 0.8 | Second model is more complete |
| Table | Account | X | X | 0.6 | First model contains 3 extra columns |

In addition, an overall matching index may be computed and shown to the user of the system. The overall matching index may be, for example, the average of all matching indexes. In the example above, the overall matching index is 0.45.

Certain modifications and improvements will occur to those skilled in the art upon a reading of the foregoing description. The above mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the following claims.

What is claimed is:

1. A method for comparing models comprising the steps of:
providing at least two models each having corresponding metamodel maps;
comparing the metamodel maps; and
generating a mapping index based upon the comparison step, wherein the mapping index includes differences between the at least two models based on the differences of the corresponding metamodel maps and includes gap analysis, wherein the model includes entities having attributes and relationships between said entities,
thereby identifying differences and similarities of the models.

2. The method of claim 1, wherein each model further includes entities.

3. The method of claim 2, wherein the entities further include attributes, relationships, and/or definitions, appropriate for each model.

4. The method of claim 2, wherein the models are comparable based upon comparison of the entities within the models.

5. The method of claim 2, wherein the models include sets of entities.

6. The method of claim 2, further including the step of matching entities within the models.

7. The method of claim 1, wherein the step of comparing includes a series of comparing steps that repeats until a final result is realized.

8. The method of claim 1, wherein a series of comparisons includes phases.

9. The method of claim 8, wherein the phases include a first phase of fine-tuning comparison data, and a second phase of automatic comparison of the models.

10. The method of claim 1, wherein the phases further include a third phase of manual comparison.

11. The method of claim 1, further including the step of indicating matches based upon a mapping index comparison.

12. The method of claim 1, further including the step of reporting results of the comparison.

13. A system for comparing models comprising:
a computer-based system for automatically comparing a visual representation of at least two models, each model having a corresponding metamodel, wherein at least two of the metamodels are different and the visual representations of the two models wherein each model includes entities having attributes and relationships between said entities, and corresponding metamodels are provided on a graphic user interface GUI on a display of the computer-based system, wherein the system automatically generates metamodel maps for making a first comparison of the models;
and wherein a visual representation of the models for making a second comparison of the models is provided on the GUI, and
a series of phases for comparison represented in a mapping index of the comparison of the metamodel maps, wherein the series of phases for comparison are automatically performed by the system based on the mapping index and identification of differences between the models.

14. A system for comparing models comprising:
a computer-based system for automatically comparing a visual representation of two models wherein each model includes entities having attributes and relationships between said entities and each model having a corresponding metamodel, wherein the metamodels are different from each other, and the visual representations of the two models and corresponding metamodels are provided on a graphic user interface GUI on a display of the computer-based system, wherein the system automatically generates metamodel maps;
a series of phases of comparison of the models using the metamodel maps, wherein the metamodel differences are comparable in a mapping index, wherein the mapping index is viewable on the GUI, thereby providing a model comparison within the mapping index for models having different metamodels.

15. The system of claim 14, wherein the models are not directly comparable without a translation.

16. The system of claim 14, wherein the mapping index provides the translation of the models that enables comparison of the models.

17. The system of claim 14, wherein the series of phases of comparison includes a first comparison of the metamodel maps and a second comparison of the visual representations of the models.

18. The system of claim 14, wherein the mapping index includes a multiplicity of factors that provide the comparison between the models.

19. The system of claim 14, wherein the mapping index further includes a weighting for the factors.

20. The system of claim 14, wherein a weighting of the factors is predetermined.

21. The system of claim 14, wherein a weighting of the factors is variable.

* * * * *